United States Patent [19]

Dantowitz et al.

[11] Patent Number: 4,543,303
[45] Date of Patent: Sep. 24, 1985

[54] FUEL CELL BATTERY WITH IN CELL OXIDANT-PRODUCT LIQUID SEPARATORS

[75] Inventors: Philip Dantowitz, Peabody, Mass.; Edward N. Balko, Middletown, N.J.; James F. McElroy, Hamilton, Mass.

[73] Assignee: United Technologies Corporation, Hartford, Conn.

[21] Appl. No.: 396,570

[22] Filed: Jul. 9, 1982

[51] Int. Cl.[4] .................... H01M 2/00; H01M 2/14
[52] U.S. Cl. .................................... 429/34; 429/38; 429/39
[58] Field of Search ................. 429/25, 34, 38, 39

[56] References Cited

U.S. PATENT DOCUMENTS

| 3,274,029 | 9/1966 | Lurie et al. | 429/25 |
| 3,370,984 | 2/1968 | Platner | 429/34 |
| 3,418,168 | 12/1968 | Wentworth | 429/34 |
| 3,823,038 | 7/1974 | Gidaspow et al. | 429/34 |
| 4,345,008 | 8/1982 | Breault | 429/26 |

*Primary Examiner*—Brian E. Hearn
*Assistant Examiner*—Stephen J. Kalafut
*Attorney, Agent, or Firm*—I. David Blumenfeld; John Swiatocha

[57] ABSTRACT

A water/gas separator for individual cells of an $H_2/O_2$ fuel cell battery includes porous hydrophilic discs which transport water but block passage of the oxidant gas.

8 Claims, 3 Drawing Figures

FUEL CELL BATTERY WITH IN CELL OXIDANT-PRODUCT LIQUID SEPARATORS

This invention relates to batteries containing a plurality of electrochemical fuel cells and, more particularly, to a structure for separating product liquid such as water from exhaust oxidant gas leaving the cathode chamber of each fuel cell.

While the invention will be described in connection with a fuel cell utilizing a membrane as the ion transporting medium between the electrodes, the invention is by no means limited thereto. The novel liquid/gas separator may be just as readily used with a fuel cell in which a liquid electrolyte sorbed in a matrix constitutes the ion transporting medium between the electrodes.

Similarly, the invention will be described in connection with a fuel cell in which $H_2$ and $O_2$ are the gases and $H_2O$ is the product liquid, but it will be apparent that the invention is by no means limited to these reactant gases and this product liquid.

Fuel cell batteries comprising a plurality of individual fuel cells to generate electrical power are well known. In such cells a reactant gas such as hydrogen is oxidized at the anode electrode associated with one side of an ion exchange membrane by release of electrons. The electrons flow through the external load while the hydrogen ion is transported through the ion exchanging membrane to a cathode electrode associated with the other side of the membrane. An oxidant such as oxygen is supplied to the cathode. The oxygen is reduced by addition of electrons and combines with the hydrogen ions transported across the membrane oxygen to form a product liquid such as water. The product liquid formed at the cathode must be removed because it tends to form a film which blocks more oxidant from reaching the electrode. A number of ways have been developed for dealing with the product water removal problem in $O_2/H_2$ fuel cells. One of these ways is the use of wicking and another is to maintain a sufficiently high flow rate of oxygen to displace water droplets from the electrode and move the entrained liquid to a collection device outside of the cell.

In fuel cell batteries with a large number of cells the problem of water removal and subsequent separation is exacerbated if the fuel cell battery is designed in a cascade arrangement, i.e., a cell arrangement in which all the gas from one group of cells in the battery enters the following group of cells in the cascade. In such a cascaded arrangement water removal by maintaining a high oxygen flow rate requires separate external water separation devices and a pair of manifolds for each stage of the cascaded battery. This complicates the external plumbing and requires relatively large numbers of manifolds and seals.

It would be desirable therefore to be able to separate the product water and the exhaust oxidant in each cell thereby permitting the cells to operate at different pressures while discharging the product water into a single common manifold. This results in a greater simplicity of operation than is possible if the depleted oxidant gas stream with the entrained product water is processed externally in a separated water/gas separator.

It is therefore a primary objective of the instant invention to provide a fuel cell battery capable of economical multi stage operation by separating product water from the oxidant gas in each cell of the battery.

Another objective of the invention is to provide a fuel cell battery in which product water and gas separation takes place in each individual cell thereby eliminating the need for external water/gas separator equipment.

Still another objective of the invention is to provide a fuel cell battery of the cascaded type in which the oxidant gas from one section of the cascade may be readily used in the next section of the cascaded battery without external water/gas separation.

Other objectives and advantages of the invention will become apparent as the description thereof proceeds.

The various objectives set forth above are realized in a fuel cell battery which comprises a plurality of cells separated into cascaded sections in which the oxidant gas from one section of the battery is directly utilizable in the next section of the battery. The cells in each section of the cascaded battery include a hydrated cation transporting membrane separating the cell into anode and cathode chambers. Anode and cathode electrodes are bonded to opposite sides of the membrane and the cells are separated by internally cooled, bipolar separators. The cathode side outlet of each cell includes cell water/gas separator elements which remove the product water from the outlet gas stream. The oxidant stream may therefore be coupled to an outlet oxidant manifold while the water is removed through a separate water outlet manifold.

The gas/water separator is based on a structure which includes a microporous valve metal (preferably niobium) structure which passes water, but not the oxidant, up to several psi of differntial pressure. Each separator includes a pair of porous hydrophilic members which function as water permeable selective barriers between each cell cathode chamber and a common water discharge manifold. Such hydrophilic, porous matrices are characterized by the fact that, when wetted, they will permit flow of liquid but prevent the passage of a gas below a certain critical pressure level, normally identified as the "bubble pressure," which is related to the pore size and surface tension of the liquid imbibed in the porous hydrophilic membrane. The average cylindrical pore diameter of the porous hydrophilic member is chosen in the range of 0.5 to 2.0 microns so as to maintain a bubble pressure which establishes a pressure difference so that water at a pressure at least at 3 psi higher than the gas pressure passes through the members into a passage between the porous members and then into the common water manifold while the gas passes out into a separate oxidant manifold.

The novel features which are believed to be characteristic of this invention are set forth in the appended claims. The invention itself, however, both as to its organization and mode of operation, together with further objectives and advantages, may best be understood by reference to the following description taken in connection with the accompanying drawings in which:

Figure 1:
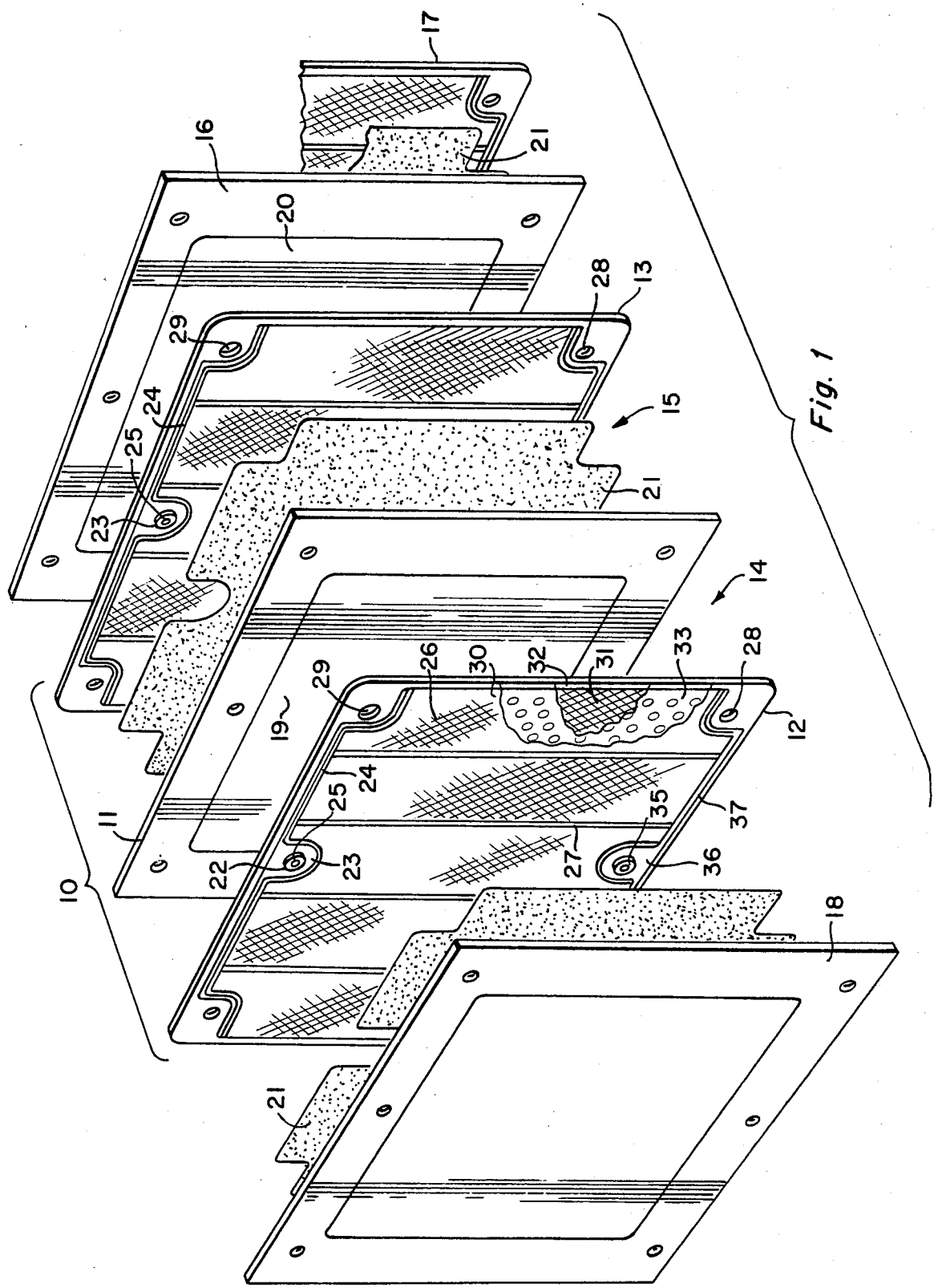
FIG. 1 is an exploded view showing several cells of a fuel cell battery incorporating the novel water gas separator of the invention.

FIG. 1 is an exploded view of several series connected fuel cells forming part of a battery and shows the novel water/gas separator associated with each cell. Fuel cell 10, forming part of the battery includes a cation exchanging membrane 11 positioned between bipolar separators 12 and 13 with the separating the cell into anode and cathode chambers 14 and 15.

The next adjacent cell consists of membrane 16 positioned between bipolar separators 13 and 17, the latter being shown in a partially broken away form. Membrane 18 is positioned between separator 12 and the next adjacent separator, not shown, and forms part of yet another cell in the battery.

An anode electrode 19, comprising a liquid and gas pervious bonded aggregate of catalytic and polymeric binder particles, is attached to one surface of membrane 11. Membrane 11, anode 19 and one side of separator 12 form anode chamber 14 and a cathode, not shown, bonded to the other side of membrane 11, and separator 13 to form a cathode chamber 15. In similar fashion separator 13, anode 20 bonded to membrane 16 and separator 17 and the electrode bonded to the other side of membrane 16 form the anode and cathode chambers of the cell to the right of cell 10.

Hydrogen is oxidized at anode 19 releasing electrons. The hydrogen ions are transported through the membrane to the liquid and gas pervious cathode attached to the opposite side of the membrane. Oxygen is introduced into cathode chamber 15 and reacts with electrons flowing to the cathode to reduce the oxygen which then combines with the hydrogen ions to form water.

If not removed promptly, the product water can form a film over the cathode electrode and hinder the cathode reaction by blocking the flow of oxygen to the cathode. In order to help prevent such "flooding" of the cathode a porous, wet-proofed, current conductive carbon sheet 21 is positioned between the cathode of each cell and the oxygen flow field defining surfaces of separators 12, 13 and 17. Sheet 21 is approximately 10 mils thick and is fabricated of carbon and a hydrophobic polymeric binder such as polytetrafluorethylene and is preferably bonded directly by the application of heat and pressure to the membrane and electrode to form a unitary structure.

The incorporation of the hydrophobic binder causes product water to "bead" so that formation of a water film is prevented and oxygen can diffuse through the pores to the cathode while product water can move through the porous sheet without flooding the pores. Reference is hereby made to U.S. Pat. No. 4,215,183, assigned to General Electric the assignee of the present application, which describes such a wet-proofed carbon paper current collector element as well as a manner for producing the same and is incorporated herein by reference.

A cylindrical oxygen or air inlet manifold 22, is located in a well 23 at the top of the separators. Manifold 22 communicates with a flow channel 24 extending across the top of the separator. Passages in manifold 22 communicate with an inlet bore 25 and oxygen or air flows into channel 24 and then over the surface of the separator which includes a plurality of conductive projections or dimples 26 which define the flow field. A plurality of parallel, spaced ridges 27 extend above the projections and define a plurality of flow fields for the oxidant. The flowing oxygen contacts the porous wet-proofed, current conductor and flows through it to the cathode in chamber 15. Separators 12 and 13 also contain hydrogen inlets 28 which introduce hydrogen into the anode chamber. Coolant inlet 29 in each of the separators allows flow of coolant water through the interior coolant chamber of bipolar separators 12 and 13.

As may be most readily seen in the broken away section of bipolar separator 12, the separator consists of an embossed cathode side flow field plate 30, a dimpled or embossed anode side plate 31, supported by a rectangular frame 32. The combination of frame 32 and plates 30 and 31 defines an interior coolant chamber. A dimpled coolant flow field insert 33 is positioned within the chamber and produces different coolant flow rates on opposite sides of chamber so that the anode plate is cooled to a greater extent than the cathode plate.

Application Ser. No. 391,800 filed on June 23, 1982, now abandoned entitled, "Fuel Cell Battery with Improved Membrane Cooling" in the name of J. F. McElroy, and assigned to the General Electric Company, the assignee of the present invention, describes and claims such an internally cooled bipolar separator. Reference is hereby made to said application and the description of the separator described and claimed therein and is hereby incorporated by reference into the instant application.

As pointed out in application Ser. No. 391,800, the anode side of a cell membrane is maintained at a lower temperature than the cathode side resulting in back diffusion of water from the cathode to the anode side of the membrane. This back diffusion compensates in part for anode side drying due to removal of membrane water of hydration by the ionic current flowing across the membrane.

Positioned at the bottom of separator 12 is a water/gas separator 35 located in a well 36. Well 36 communicates with an oxygen and a product water flow channel 37 extending along the bottom of the separator. Oxygen which has not been consumed at the cathode as well as product water from the cathode is collected in channel 37 and well 36. The gas/water separator processes the water-oxygen mixture exiting from each cell and separates the water from the oxygen and these flow into separate manifolds. Thus, different stages of a cascaded battery may operate at different pressures, yet discharge product water into a common manifold thereby eliminating a large number of manifolds and seals. Separator 35, as will be pointed out in detail in connection with FIGS. 2 and 3, includes hydrophilic, porous discs which are permeable to water but impermeable to gas below a preselected higher pressure (the "bubble pressure"). The water and exhaust oxidant are thus separated at outlet of each cell and removed by means of separate gas and water manifolds common to all the cells in the battery.

Suitable openings in the non-active border of membranes 11, etc. are aligned with the coolant, $H_2$, $O_2$ and product $H_2O$ flow manifolds to permit flow of these liquids and fluids to and from each of the cell chambers. The non-active membrane border is covered with a silicone adhesive and the membranes and separators are clamped together by suitable metallic endplates, not shown. Valve inlet conduits in the endplates communicate with the fuel, oxidant and coolant manifolds to permit flow of the gases into the individual cell chambers of coolant into the bipolar separators. Similar valved outlet conduits in the endplates communicate with these manifolds to permit removal of the product water, coolant and excess gases. The product water outlet valve is preferably a back pressure regulating valve which maintains the water pressure of the oxidant/product water mixture at 3 psi above that of the water outlet manifold.

The membranes are preferably perfluorsulfonic cation exchange membranes of the type sold by the DuPont Company under its trade name Nafion. Such membranes have a fluorocarbon backbone. Sulfonic acid functional groups are attached to the backbone and act as the ion exchanging sites.

Electrodes are preferably bonded agglomerates of catalytic platinum group metal and polymeric binder particles. The Catalytic particles may be platinum black or particles of other platinum group metals or oxides of such platinum group metals. The polymeric binder is preferably a hydrophobic binder such as polytetrafluorethylene. A mixture of the catalytic and polymeric binder particles is placed on a thin titanium foil and one side of the membrane is placed over the mixture on the foil. The particles are bonded to each other and to the membrane to form a gas and liquid pervious electrode by the application of heat and pressure for a period of three to five minutes. The pressure is not critical and can be in the range of 400 to 1000 psi with a pressure of approximately 800 psi being preferred. Similarly the temperature is not critical and may vary from 200° to 600° F. with the preferred upper end of the range being at least that temperature at which the polymeric binder particles are sintered together with the catalytic particles. The lower end of the temperature range is roughly between 200° and 250° F., i.e. that temperature where adhesion becomes questionable.

If it is desired to bond the wet-proofed carbon paper to the membrane along with the electrode the procedure is only slightly changed. In that case, the wet-proofed carbon paper is placed on the titanium foil and the powder mixture of catalyst and hydrophobic binder is dispersed over the surface of the carbon paper. The membrane is placed over the mixture and carbon paper and heat and pressure is applied to bond the electrode and the carbon paper to the membrane.

The cathode flow plate of the bipolar separator is preferably fabricated of commercially pure niobium and may be approximately 5 mils thick. The anode flow plate, as shown in FIG. 1, is preferably fabricated of zirconium because of zirconium's excellent resistance to hydrogen embrittlement, although other material such as niobium may also be utilized. The coolant flow field insert is preferably formed of titanium and includes a plurality of hemispherical projections which define the coolant flow along opposite sides of the separator. The coolant flow insert is not fixed in the chamber frame but is loosely retained between the anode and cathode flow field plates. The various plates, as pointed out previously, are formed of embossed 5-mil-thick zirconium, niobium and titanium sheet stock. The depth of the various dimples and the spacings therebetween are obviously a function of the desired flow rate and mass flow for the various reactants and coolants. Thus, the projections in the anode and cathode distribution plates may for example have an 80 mil spacing and be 10 mils deep. Projections on the coolant flow distribution plate, on the other hand, have a depth of 50 mils and a 250 mil spacing simply because of mass transfer of coolant to the interior cavity of the separator is much greater than that of the reactant gases flowing over the outside flow field plates. As may be seen in FIG. 1 the projections are in offset rows the precise spacing being determined by the desirable flow pattern for the fluids. It will be obvious to the man skilled in the art the heighth, spacing, shape of these dimples may be varied to achieve desired flow pattern both on the surface and internally of the bipolar separator cartridge.

The novel gas water separator, as will be described in greater detail later in connection with FIGS. 2 and 3, includes a hydrophilic porous matrix means which permits the flow of water but prevents passage of a gas below a certain critical pressure level customarily identified as the "bubble pressure". The bubble pressure for any such porous matrix is related to the pore size by the relationship:

$$P = \frac{2 \text{ (surface tension)}}{\text{(pore radius for nominally cylindrical hydrophilic pores)}}$$

The pore size is selected so that the pressure required to initiate gas flow through the matrix is considerably greater than the differential pressure between the cell of the largest gas pressure and the discharge manifold.

Figure 2:
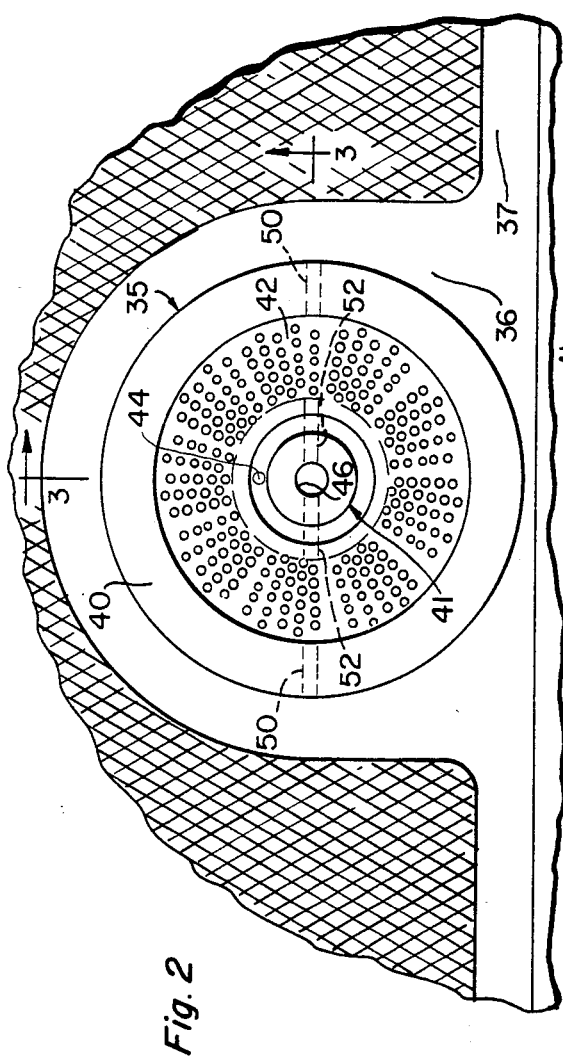
FIG. 2 is a partially broken away section of a bipolar coolant separator including the water/gas separator element.

As seen in FIG. 2, the in-cell gas/water separator generally is comprised of a disc shaped outer frame 40, a coaxial outlet manifold hub 41 and a pair of porous, hydrophilic discs 42 positioned between the frame and the hub. Water separator discs 42 are preferably formed of a sintered valve metal such as niobium although any other porous material will also function effectively. Frame 40 contains a plurality of inlet passages 50 through which the mixture of oxygen and product water from well 36 is introduced into a chamber formed by the porous, hydrophilic separator discs 42. Water passes through the hydrophilic discs into a water chamber formed by the porous discs of adjacent water/gas separators and flows into product water outlet bore 44 extending through hub 41. The oxygen from which the water has now been removed passes through suitable passages 52 in hub 41 to an oxygen outlet bore 46 extending axially along the hub.

Figure 3:
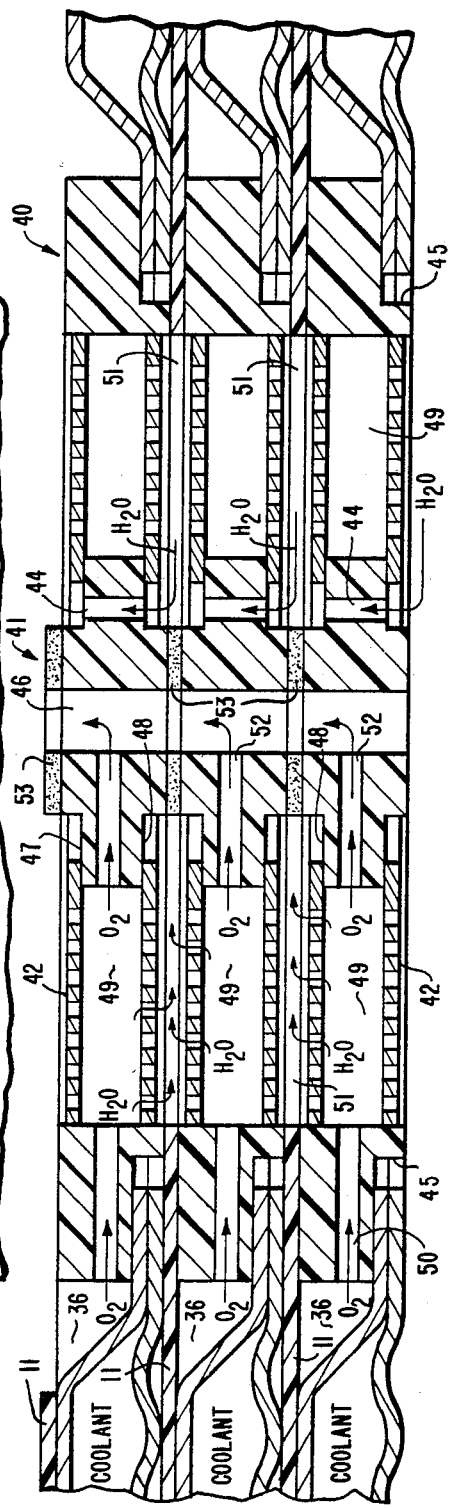
FIG. 3 is a sectional view taken along lines 3—3 of the product water/gas separator of FIG. 2.

FIG. 3 shows a sectional view taken along line 3—3 of FIG. 2. FIG. 3 shows three stacked product water/gas separator assemblies and specifically illustrates the manner in which oxygen flows to the oxygen outlet manifold and product water, which has passed through the porous hydrophilic discs, moves into the product water outlet manifold through a water passage formed by the porous discs of adjacent separators. The disc shaped outer frames 40 include shoulders or ledges 45 which support the bipolar coolant separators. Similarly, hub 41 contains shoulders 47 and 48 which support the interior edge of the upper and lower water separator discs 42. The outer edges of the cylindrical discs butt against the shoulder of the outer frame and are attached to the supports by an adhesive. Each pair of discs 42 forms an interior water/gas chamber 49 which communicates with well 36 of the separator through passages 50. Oxygen and water pass into chamber 49 and the water moves through the porous discs into a water collection chamber 51 formed by the porous hydrophilic discs of adjacent water separators.

The oxygen which cannot pass through the discs remains in chamber 49 and flows through passage 52 in hub 41 to the oxygen outlet manifold 46. The plurality of product water and gas separators are asembled by means of double sided adhesive tapes 53 located between the hubs of adjacent separators.

Product water outlet manifold 44 extends through the shoulder of the separator hub and communicates with the water collection chamber 51. Product water from the well 36 of each of the bipolar cell separators flows through passage 50 of the separator in water/gas separator frame 40 into water/gas chamber 49. Water then passes through hydrophilic discs 42 into product water collection chamber 51 and then to the common product water manifold 44. Oxygen in the oxygen/water chamber 49 passes to the oxygen outlet manifold through the passage 52 in hub 41.

In a typical system the oxygen product water mix entering the water/gas chamber is maintained at a pressure which is 3 psi greater than the pressure in the water collection chamber and in the common product water manifold. The "bubble pressure" for the water permeable matrix must be at least several psig greater than the pressure in the water collection chamber. A porous matrix of niobium or other material, having cylindrical pores with an average diameter of one (1) micron ($\mu$), is adequate to maintain the desired "bubble pressure" to prevent oxidant from passing through the matrix.

It can be seen, therefore, that a simple and effective cell water/gas separator has been provided which eliminates the need for external separation devices. Furthermore, exhaust gases and product water are removed from the cells by means of separate water and gas manifolds.

While the instant invention has been shown with certain preferred embodiments thereof, the invention is by no means limited thereto since other modifications of the instrumentalities employed may be made and still fall within the true scope and spirit of the invention.

What is claimed as new and desired to be secured by Letters Patent of the United States is:

1. A fuel cell battery comprising at least two adjoining fuel cells each of said cells comprising:
   (a) an ion transporting membrane separating the cell into anode and cathode chambers,
   (b) anode and cathode electrodes in intimate contact with opposite surfaces of said ion transporting membrane,
   (c) bipolar separator means positioned between the ion transporting membranes of adjacent cells, adapted to contact the anode electrode of one cell and the cathode electrode of an adjacent cell,
   (d) means for supplying a fuel gas to the anode chamber and an oxidant gas to the cathode chamber,
   (e) separating means associated with the cathode chamber of each cell for separating product liquids entrained in the oxidant gas stream from the gas stream, including a porous, hydrophilic structure which is permeable to liquid but is impermeable to gas flow at gas pressures below the "bubble pressure P" of the porous structure, where "bubble pressure P" is related to the pore size of the structure by the relationship:

$$P = \frac{2 \text{ (surface tension)}}{\text{pore radius}}$$

(f) the porous hydrophilic structure associated with the cathode chambers of adjacent cells forming a common liquid collecting chamber into which liquid entrained in the oxidant gas stream from the cathode chambers of adjacent cells is transported,
   (g) separate output manifold means common to all of said fuel cells communicating with the liquid collecting chamber for receiving liquid passing through said liquid permeable means, and common output manifold means for all of said fuel cells for receiving oxidant gas after removal of product liquid.

2. A fuel cell battery according to claim 1 wherein said liquid is water and the separating means includes a chamber communicating with the cathode chamber of each cell to introduce the product water containing gas stream exiting from said cathode chamber to said chamber, a portion of the wall of said chamber in each cell comprising said porous, hydrophilic structure, said structure forming one wall of said common liquid chamber formed between adjacent cells to permit removal of the water entrained in the gaseous stream.

3. A fuel cell battery according to claim 1 wherein each of said water and gas separating means in each cell includes a pair of spaced apart, parallel porous, hydrophilic structures to define the chamber communicating with the cathode chamber of each fuel cell.

4. The fuel cell battery accoring to claim 1 wherein said water permeable and gas impermeable means comprises a porous, hydrophilic sintered valve metal structure.

5. A fuel cell comprising:
   (a) a hydrated, ion-exchanging membrane separating the cell into anode and cathode chambers,
   (b) anode and cathode electrodes in intimate contact with opposite surfaces of the membrane,
   (c) means for supplying a fuel gas to the anode chamber,
   (d) means for supplying an oxidant gas to the cathode chamber,
   (e) means associated with the cathode chamber of said cell for separating product water entrained in the oxidant gas leaving said cathode chamber, including a pair of porous, hydrophilic, structures forming a water gas separator chamber, each of said structures permeable to water but impermeable to gas flow at gas pressures below the "bubble pressure P" of the porous structure, where "bubble pressure P" is related to the pore size by the relationship:

$$P = \frac{\text{(surface tension)}}{\text{pore radius}}$$

(f) means for introducing the oxidant gas stream exiting from said cathode chamber to said water separation chamber, the water entrained in said gas stream passing through said porous, hydrophilic structures,
   (g) means for removing the oxidant gas from said gas water separation chamber after removal of product water from the chamber.

6. The fuel cell according to claim 5 wherein the water permeable but gas impermeable member includes a porous, sintered valve metal structure.

7. A fuel cell battery according to claim 5 wherein the pore size of said porous member is such as to maintain a bubble pressure greater than the largest differential pressure between any given cell in said battery and the pressure in said discharge manifold.

8. The claim according to claim 7 wherein the average diameter of said porous member is one (1) micron.

* * * * *